United States Patent

[11] 3,626,174

| [72] | Inventor | John Webster Cranmore<br>Birmingham, England |
|---|---|---|
| [21] | Appl. No. | 844,288 |
| [22] | Filed | July 24, 1969 |
| [45] | Patented | Dec. 7, 1971 |
| [73] | Assignee | Joseph Lucas (Industries) Limited<br>Birmingham, England |
| [32] | Priority | Aug. 9, 1968 |
| [33] | | Great Britain |
| [31] | | 38,066/68 |

[54] HEADLAMP ASSEMBLIES
3 Claims, 4 Drawing Figs.

[52] U.S. Cl. ............................................. 240/7.1
[51] Int. Cl. ............................................. B60q 1/00
[50] Field of Search ........................... 240/7.1, 7.1
H, 8.1; 74/503

[56] References Cited
UNITED STATES PATENTS

| 2,084,120 | 6/1937 | Ames | 240/7.1 |
|---|---|---|---|
| 2,119,892 | 6/1938 | Snow | 240/7.1 |
| 2,312,005 | 2/1943 | Smith | 240/7.1 |
| 2,324,742 | 7/1943 | Voorhees et al. | 240/7.1 |
| 2,421,680 | 6/1947 | Candlin, Jr. et al. | 240/7.1 |
| 3,266,336 | 8/1966 | Henry-Biabaud | 240/7.1 X |
| 3,284,623 | 11/1966 | Neal | 240/7.1 |
| 3,387,125 | 6/1968 | Ingolia | 240/7.1 |

FOREIGN PATENTS

| 1,053,835 | 1/1967 | Great Britain | 240/7.1 |
|---|---|---|---|
| 1,075,737 | 7/1967 | Great Britain | 240/7.1 |
| 1,080,587 | 8/1967 | Great Britain | 240/7.1 |
| 929,497 | 7/1947 | France | 240/7.1 |

*Primary Examiner*—Louis J. Capozi
*Attorney*—Holman and Stern

ABSTRACT: A headlamp assembly for a road vehicle including a support member which is adapted to be secured to the body of a road vehicle, and a headlamp pivotally mounted on the support member for movement between a first inoperative position and a second operative position. In the first inoperative position a part associated with the headlamp constitutes part of the exterior surface of the body of the vehicle, and the headlamp is enclosed by the body of the vehicle. In the second, operative position of the headlamp the optical axis of the headlamp extends generally longitudinally of the vehicle with at least the lens of the headlamp exposed so that the headlamps when energized, illuminates the road in front of the vehicle. Latch means is provided for retaining the headlamp in either of its first or second positions.

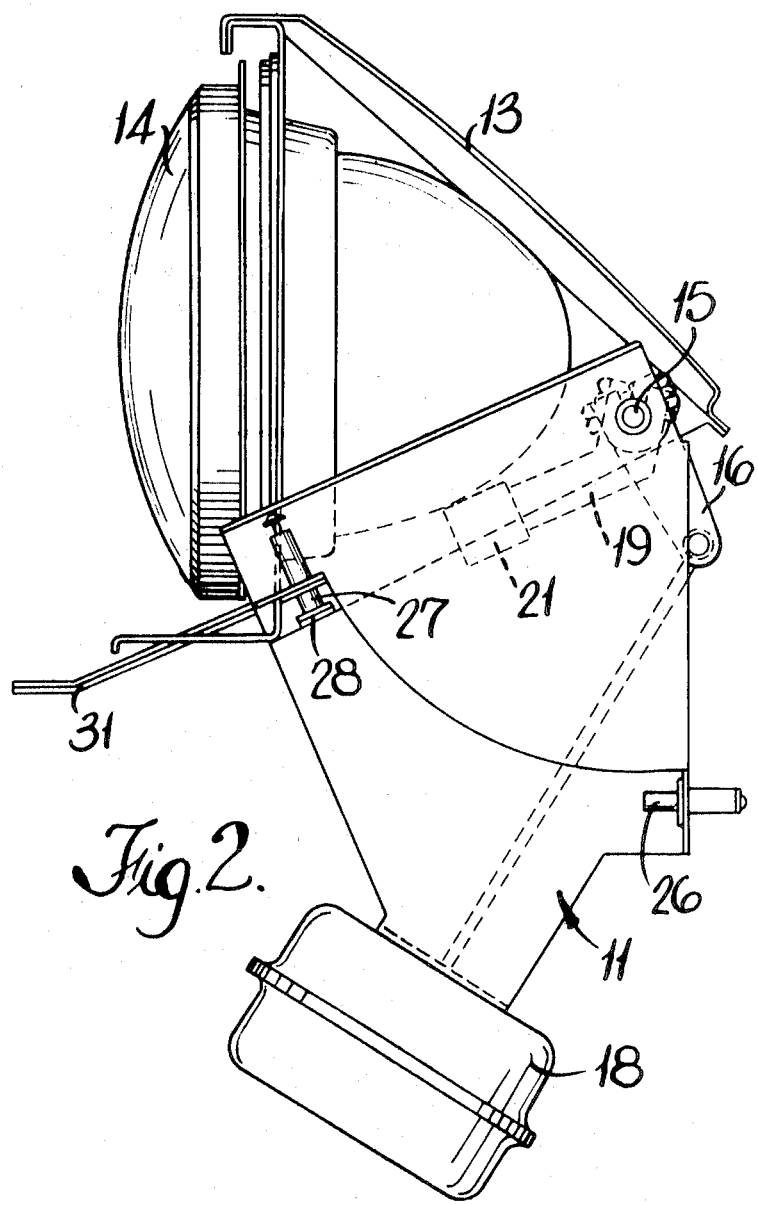

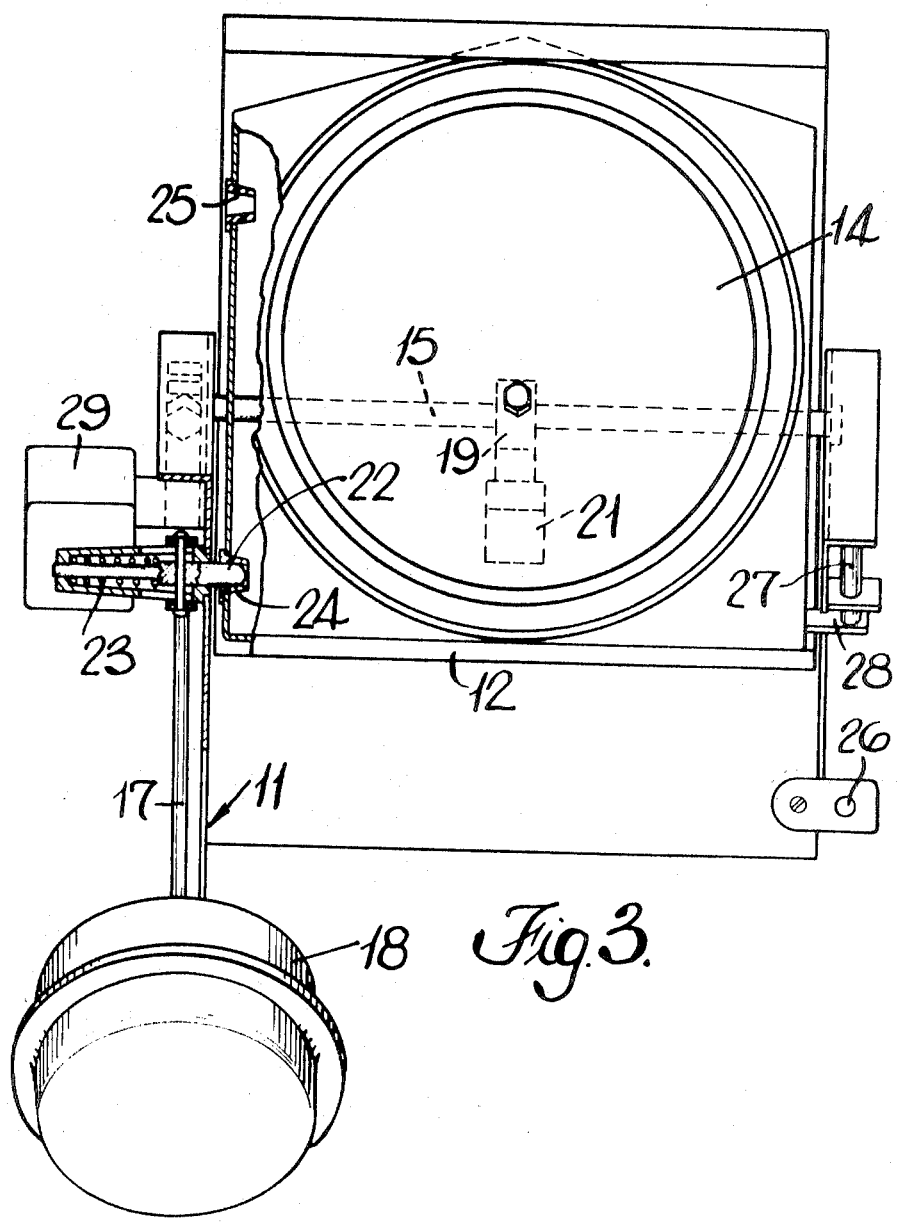

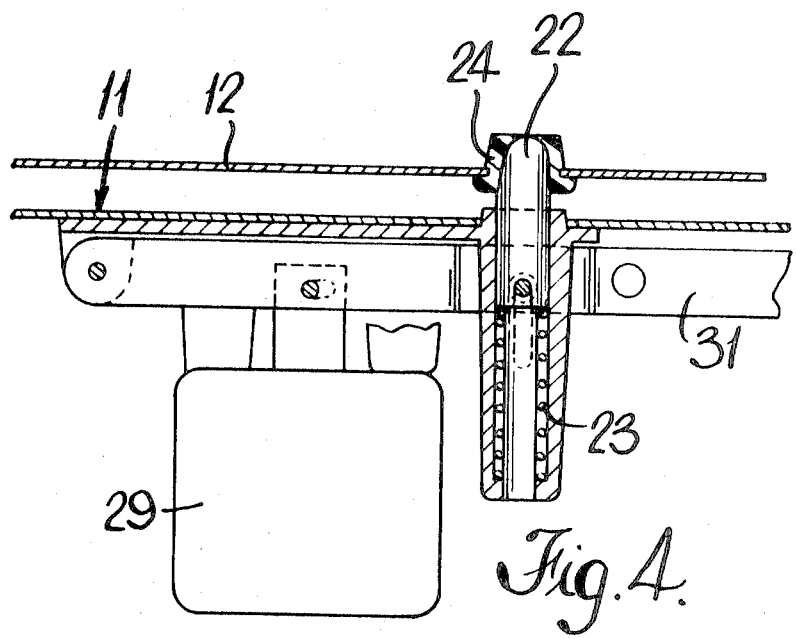

HEADLAMP ASSEMBLIES

This invention relates to headlamp assemblies for road vehicles.

A headlamp assembly according to the invention includes a support member adapted to be secured to the body of a road vehicle, a headlamp pivotally mounted on said support member for movement between a first, inoperative position wherein a part associated with the headlamp constitutes part of the exterior surface of the body of the vehicle, and the headlamp is enclosed by the body of the vehicle, and a second, operative position wherein the optical axis of the headlamp extends longitudinally of the vehicle, and at least the lens of the headlamp is exposed, and latch means operable to retain the headlamp in either of said first and second positions.

One example of the invention is illustrated in the accompanying drawings wherein:

FIG. 2 is a view similar to FIG. 1 but of the opposite side of the assembly with parts thereof omitted for clarity, FIG. 3 is a part sectional view on the line 3—3 in FIG. 1, and FIG. 4 is a fragmentary sectional view on the line 4—4 in FIG. 1.

Figure 1:
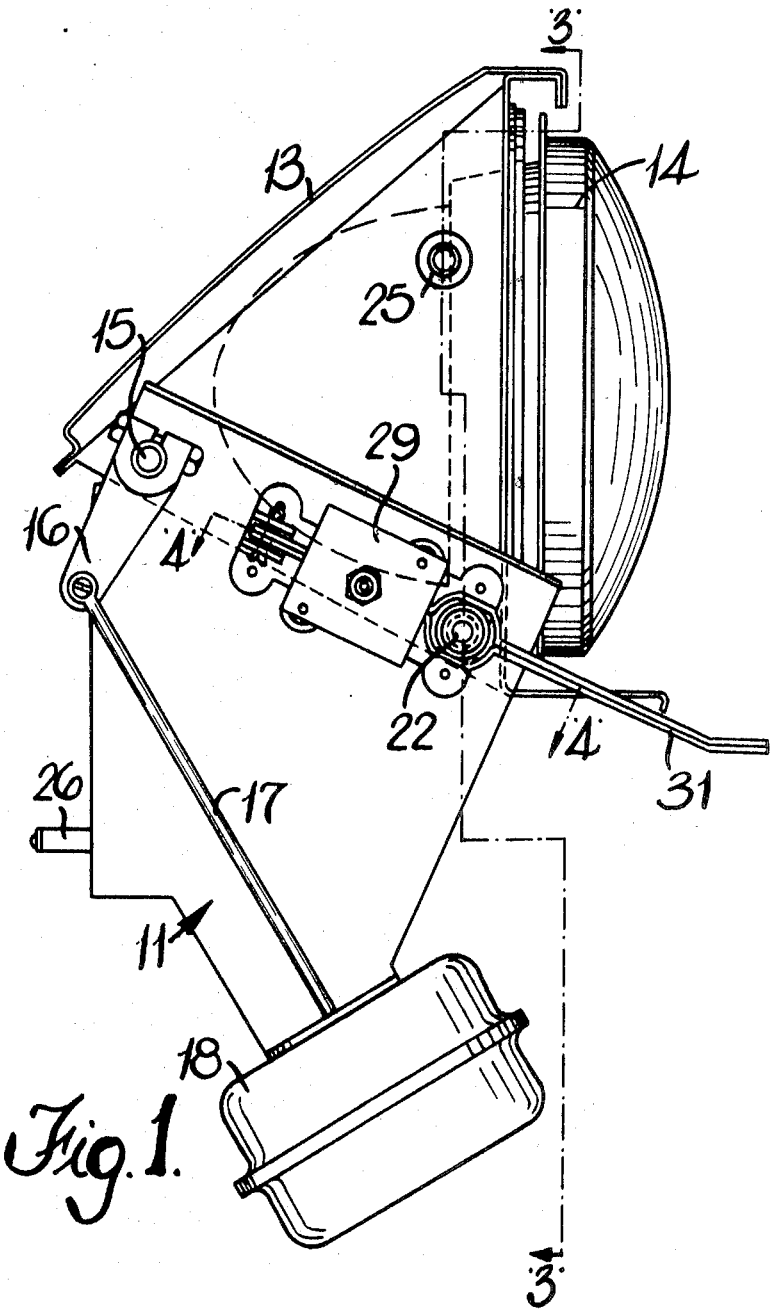
FIG. 1 is a side elevational view of a headlamp assembly.

Referring to the drawings, the headlamp assembly includes a support frame 11 having a pair of generally parallel sidewalls, which is adapted to be secured to the body of a road vehicle adjacent an aperture in the bonnet of the road vehicle, at one side, and towards the front of the bonnet. A second, identical headlamp assembly is mounted at the other side of the road vehicle, and since both headlamp assemblies are identical only one will be described. Pivotally mounted in the support frame, for movement about a generally horizontal axis, extending transversely of the vehicle, is a headlamp carrier 12, the upper surface 13 of the headlamp carrier being so shaped that in one position of the carrier 12 relative to the support frame 11, the upper surface 13 of the carrier closes the aperture in the bonnet, and constitutes part of the bonnet. A sealed beam headlamp unit 14 is adjustably mounted on the front wall of the carrier member 12, so as to move with the carrier member 12 relative to the support frame 11. The member 12 is pivotally mounted in the frame 11 through a shaft 15 which is mounted for rotation in the frame 11 and the carrier 12 and coupled to the shaft 15 is a lever 16 which is connected at its end remote from the shaft 15 to the piston rod 17 of a vacuum unit 18. A further lever 19 (FIG. 2) is coupled to the shaft 15 and bears against the rear cover of the unit 14 through a rubber buffer 21, the arrangement being such that when vacuum is applied to the vacuum unit 18, then the shaft 15 is pivoted relative to the frame 11 and the lever 19 pivots the carrier member 12 together with the headlamp unit 14 from a first position wherein the headlamp unit 14 is enclosed within the body of the road vehicle, and the upper surface 13 of the carrier member 12 closes the aperture in the bonnet, to a second position wherein the headlamp unit 14 is exposed, and is positioned so that the beam of the headlamp is directed in a manner to illuminate the road in front of the vehicle.

Mounted on one of the sidewalls of the support frame is solenoid operated latch, the latch bolt 22 of which is normally urged by a spring 23 towards the carrier member 12. The wall of the carrier member 12 adjacent the latch is provided with a pair of hollow bushes 24, 25 of internal diameter equal to the external diameter of the latch bolt 22, the bushes 24, 25 lying at angularly spaced points on the circumference of an imaginary circle struck from the pivotal axis of the carrier member 12. The two bushes are so positioned that in the first position of the carrier member 12 the latch bolt 22 can enter the bush 25, while in the second position of the carrier member the latch bolt can enter the bush 24.

A pair of switches 26, 27 are mounted on the support frame 11, at a pair of angularly spaced points respectively on the circumference of a second imaginary circle struck from the pivotal axis of the carrier member 12, and engageable with the switches 26, 27 respectively is a stop 28 integral with the carrier member 12, the switches 26, 27 are so arranged that the switch 26 is operated by the stop 28 when the carrier member 12 is in its first position, and the switch 27 is similarly operated when the carrier member 12 is in its second position.

The headlamps of the vehicle are controlled by a control switch which is conveniently positioned on the dashboard of the vehicle. The control switch is conveniently of the form described in British Pat. No. 1,043,937 wherein the switch has a lever which controls both a valve and electrical contacts. The valve of the switch is connected in the vacuum line to the vacuum units of the headlamp assemblies, and the electrical contacts control both switching on and switching off of the headlamps, and energization of the solenoid latches of the two headlamps.

The operation of the headlamp assembly is as follows. With the assembly in its first position, the upper surfaces 13 of the carrier member 12 is closing the aperture in the bonnet of the vehicle, and the switch 26 is held open by the stop 28. The latch bolt 22 is engaged in the bush 25, so that the carrier member 12 is locked in its first position. Operation of the control switch completes the circuit to the solenoid 29 of the latch through the switch 27 to withdraw the latch bolt 22 from the bush 25, and fractionally afterwards completes the vacuum line to the unit 18. Thus the carrier member commences to move under the action of the vacuum unit 18 to its second position. During the movement of the carrier member 12 from its first to its second position the switch 26 is released, and so closes. As the carrier member reaches its second position, the switch 27 is opened by the stop 28 to deenergize the solenoid 29. The bush 24 is aligned with the latch bolt 22, and the latch bolt 22 is urged by the spring 23 into engagement with the bush 24, to lock the carrier member 12 in its second position. However, closure of the switch 26 at this stage does not cause retraction of the latch bolt 22 since the arrangement of the main control switch is such that the circuit to the switch 26 is not completed when the control switch is in its "up" position. The carrier member 12 is now locked in its second position by the latch bolt 22, and the headlamp unit 14 is switched on, the circuit to the filaments of the headlamp being completed, as stated above, through the main control switch. The switch 27 is opened and vacuum is still applied to the vacuum unit.

In order to return the assembly from its second position to its first position, the main control switch is moved to its "down" position, the arrangement being such that moving the main control switch to its "down" position completes the circuit through the switch 26, which is now closed, to the solenoid 29 to retract the latch bolt 22. The movement of the main control switch to its "down" position also breaks the vacuum supply to the vacuum unit 18, and vents the vacuum unit 18 to atmosphere through a restrictor. Thus the carrier member 12, together with the headlamp unit, is free to pivot under gravity, as the vacuum in the vacuum unit 18 collapses, back to its first position. During return movement of the unit the stop 28 permits the switch 27 to close and opens the switch 26. The opening of the switch 26 breaks the circuit to the solenoid 29 and the latch bolt 22 is allowed to move under the action of its spring 23. Thus as the carrier member 12 reaches its first position the bush 25 is again aligned with the latch bolt 22, and the latch bolt 22 engages the bush 25 to lock the carrier member 12 in its first position. When the carrier member 12 is in its first position the switch 27 is closed, but the latch bolt 22 is not retracted since the main control switch is in its "down" position, and the circuit to the switch 27 is not completed. Movement of the main control switch to its "down" position also breaks the circuit to the filaments of the headlamp.

The headlamp is of course provided with main and dipped beam filaments and a separate switch dependent on the closure of the main control switch, is provided for controlling the main and dipped beam operations of the lamp.

If desired a spring may be incorporated in the headlamp assembly to aid the action of gravity in returning the carrier member 12 from its second, operative position to its first, inoperative position.

A manually operable lever 31 pivotally mounted at one end on the support frame 11, and pivotally connected intermediate its end to the latch bolt 22 is provided in the assembly, so that in the event that the solenoid 29 of the solenoid operated latch fails, then the latch bolt 22 can be operated manually to release the carrier member 12. Moreover, in the event that the vacuum supply to the unit 18 fails the carrier member 12 can be pivoted manually from its first to its second position upon release of the latch. Since the shaft 15 engages the headlamp unit 14 only by the buffer 21 bearing on the unit 14 then the manual movement of the carrier member 12 to its second position can take place relative to the buffer 21, the lever 19 and the shaft 15 and so does not necessitate movement of the diaphragm of the unit 18.

Having thus described my invention what I claim as new and desire to secure by Letters Patent is:

1. A head lamp assembly for a road vehicle including,
   a support member arranged to be secured to the body of a road vehicle,
   a headlamp carrier,
   a headlamp secured to said headlamp carrier,
   means pivotally mounting said headlamp carrier on said support member for movement between a first inoperative position wherein a part associated with the headlamp carrier constitutes part of the exterior surface of the body of the vehicle and the headlamp is enclosed by the body of the vehicle, and a second operative position wherein the optical axis of the headlamp extends longitudinally of the vehicle and at least a lens of the headlamp is exposed,
   latch means, including parts on the headlamp carrier and the support member respectively, one of said parts being a latch bolt movable between a position wherein the latch bolt serves to retain the headlamp carrier in either of said first and second positions, and a position wherein the headlamp carrier is free to pivot relative to the support member,
   a solenoid device,
   means coupling the solenoid device to the latch bolt so that the latch bolt is moved in one direction by operation of the solenoid device, and,
   manually operable means whereby said latch bolt can be moved manually.

2. An assembly as claimed in claim 1 including vacuum operable means for moving the headlamp between said first and second positions.

3. An assembly as claimed in claim 2 wherein said vacuum operable means is so engaged with said headlamp that said headlamp can be moved manually without said means being caused to move.

* * * * *